United States Patent
Rizzo

[11] 3,710,883
[45] Jan. 16, 1973

[54] FOLDING MOTORCYCLE OR THE LIKE

[76] Inventor: Pantaleone L. Rizzo, 97-15 72nd Drive, Forest Hills, N.Y. 11375

[22] Filed: Oct. 22, 1971

[21] Appl. No.: 191,939

[52] U.S. Cl. .................180/33, 280/278, 280/287
[51] Int. Cl. ...............................................B62d 3/00
[58] Field of Search .................280/278, 287; 180/33

[56] References Cited

UNITED STATES PATENTS

| | | | |
|---|---|---|---|
| 3,580,348 | 5/1971 | Blasi | 280/278 |
| 3,079,172 | 2/1963 | Burwell | 280/278 |
| 2,839,146 | 6/1958 | Bouffort | 280/278 |

*Primary Examiner*—Albert J. Makay
*Assistant Examiner*—John Mannix
*Attorney*—Leonard H. King

[57] ABSTRACT

An extremely compact, low cost, folding motorcycle or motor scooter is provided by means of a novel, rod-like construction. A frame-like chassis defines a compartment for receiving the front and wheel assembly in the folded condition. Portions of the chassis are removable for this purpose. Other portions of the chassis provide pivot means for the front and rear wheel assemblies. The pivot means are skewed at an angle with respect to an axis transverse to the longitudinal axis of the motorcycle so that the front and rear wheel assemblies bypass each other and are in side-by-side relationship in the folded condition. An internal combustion engine is used for the drive means with the seat of the motorcycle preferably being at least partially hollow in order to define a fuel tank. The handle-bar assembly is foldable and is removably keyed to the steering means.

The aforementioned abstract is neither intended to define the invention of the application which, of course, is measured by the claims, nor is it intended to be limiting as to the scope of the invention in any way.

9 Claims, 12 Drawing Figures

PATENTED JAN 16 1973

FOLDING MOTORCYCLE OR THE LIKE

BACKGROUND OF THE INVENTION

1. Field of the Invention

This invention relates generally to motorcycles and more particularly to a low-cost folding motorcycle, motorscooter or the like.

2. Description of the Prior Art

Folding motor scooters or motorcycles are well known in the prior art. However, as disclosed in the prior art, in order to achieve compactness in the folded condition, the motor scooter in many instances must be almost completely disassembled. That is, the front and wheel assemblies must be removed from the chassis and then stored in a suitable compartment.

It is also well known in the prior art to store the front and wheel assemblies in a skewed condition with respect to each other in order to achieve the goal of compactness. It will be appreciated from the foregoing that complete removal of the front and wheel rear assemblies complicates the subsequent reassembly of the apparatus.

SUMMARY OF THE INVENTION

By way of contrast, the present invention provides front and rear wheel assemblies that are pivoted about forward and rearward sections of the chassis itself, and, in the folded condition are stored within the chassis. The pivot axes of the front and rear wheel assemblies are skewed with respect to an axis that is transverse to the longitudinal axis of the motorcycle so that in the folded condition the front and rear wheel assemblies bypass each other and thereby occupy a substantially smaller volume.

Accordingly, an object of the present invention is to provide an improved, low cost, folding motor scooter.

Another object of the present invention is to provide a folding motorscooter comprised substantially of tubular sections.

Still another object of the present invention is to provide a tubular, frame-like chassis for a folding motor scooter wherein the front and rear wheel assemblies are received within the chassis in the folded condition.

An additional object of the present invention is to provide a folding motor scooter or the like, as described above, wherein the front and rear wheel assemblies pivot about the skewed axes in order to be received within the chassis assembly.

Still another object of the present invention is to provide a folding motor scooter or the like, as described above, that is driven by an internal combustion engine and wherein the hollow seat thereof defines the fuel tank.

A feature of the present invention is that the various tubular members comprising the present invention are readily separable without the use of special tools and without special skills.

An advantage of the present invention is that in the folded condition, the motorcycle or the like, as described above, is extremely compact.

These and other objects, features and advantages of the invention will, in part, be pointed out with particularity and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts.

In the Drawing.

DESCRIPTION OF THE PREFERRED EMBODIMENT

Figure 10:
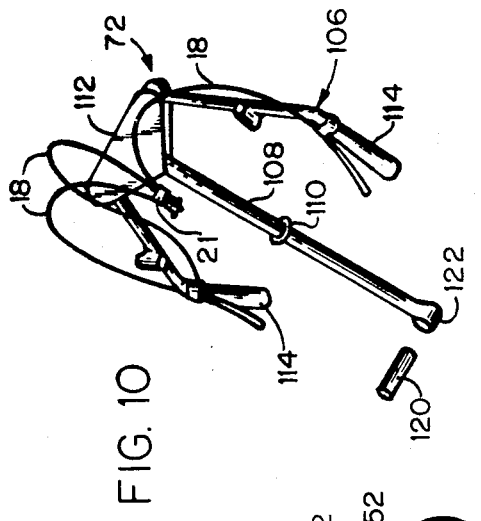
FIG. 10 is a perspective view of the handle bar assembly of the present invention.

Referring now to the drawing, there is shown a motor scooter 10 comprising the present invention. The basic element of the motor scooter 10 is a tubular frame-like chassis 12 including a seat 14 that is at least partially hollow in the preferred embodiment for defining a fuel tank. An internal combustion engine 16 is mounted on the chassis 12 in any suitable manner and by conventional means and is provided with conventional brake and throttle cables 18. A preferred drive for the present invention employs a conventional timing belt drive system 20 such as manufactured by the U.S. Rubber Co. Quick disconnect means 21 (FIG. 10) are used with the cables 18.

The chassis 12 is comprised of right and left hand frame sections each of which includes a longitudinally extending top tube 22, a longitudinally extending bottom tube 24, a generally vertically extending forward tube 26, and a generally vertically extending rear tube 28. The four tubes 22, 24, 26, 28, just described are welded to each other to define a pair of rigid, rhomboidal shapes, each of which is further provided with a diagonal tube 30 that extends in a generally vertical plane, from the juncture of the top and forward tubes 22 to 26 to the juncture of the bottom and rearward tubes 24 and 28 in each frame section. The diagonal tubes 30 are also welded to the chassis frame sections.

The two chassis side frame assemblies are laterally spaced apart and are connected to each other by a diagonal tube 32 that is located in a generally horizontal plane and which is rigidly secured at the juncture of the bottom and forward tubes 24, 26, of one of the side frame chassis sections to the juncture of the bottom and rear tubes 24, 28 of the opposite chassis side frame sections. The two chassis side frame sections are further secured to each other by removable, forward and rearward, transverse upper tubes 34 and 36 at the juncture of the top and forward tubes 22, 26 and the juncture of the top and rearward tubes 22, 28, respectively. The forward and rearward tubes 34, 36 are removable for purposes to be described hereinafter.

At its bottom end, the tubular side frame sections of the chassis 12 are secured to each other by forward and rearward tubes 38 and 40 which are skewed in the preferred embodiment of the present invention at equal angles α with respect to an axis that is transverse to the longitudinal axis of the motorcycle. A convenient angle α for the skewing of the forward and rear tubes 38 and 40 has been found to be approximately 5°. Structural rigidity, in the erected condition, is not sacrificed by skewing of the forward and rear tubes 38, 40 and yet a more compact structure in the folded condition is provided.

Figure 4:
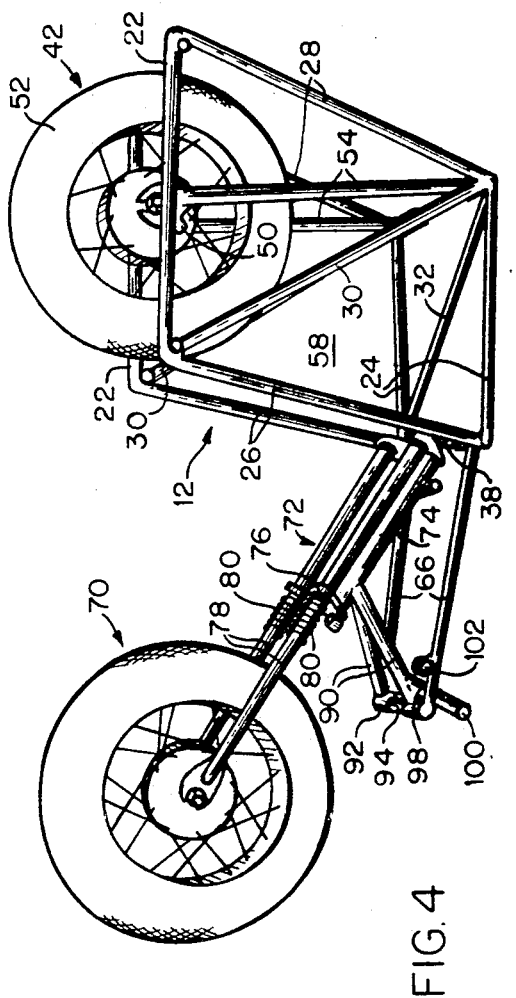
FIG. 4 is a perspective view, taken from the side, illustrating an early stage in the folding sequence of the present invention.
Figure 3:
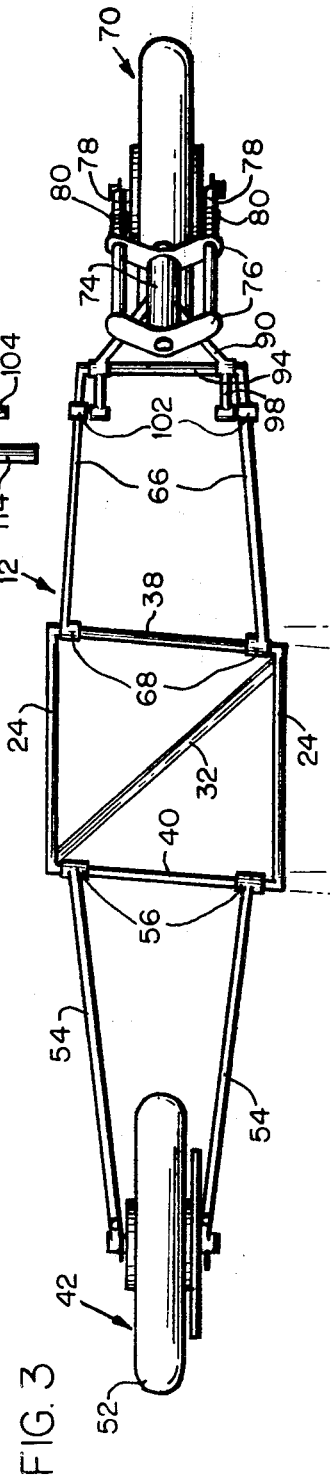
FIG. 3 is a top plan view, similar to FIG. 2, but with portions removed for clarity.
Figure 6:
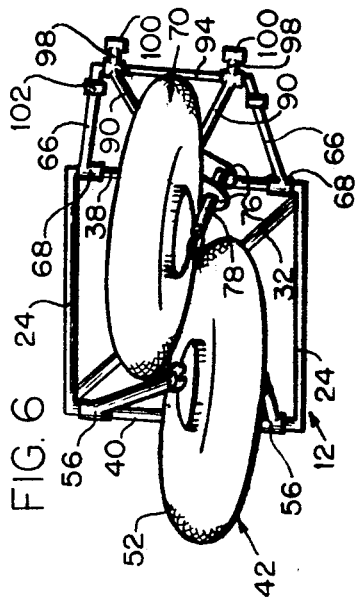
FIG. 6 is another top plan view, similar to FIG. 5, illustrating a further step in the folding sequence of the present invention.
Figure 5:
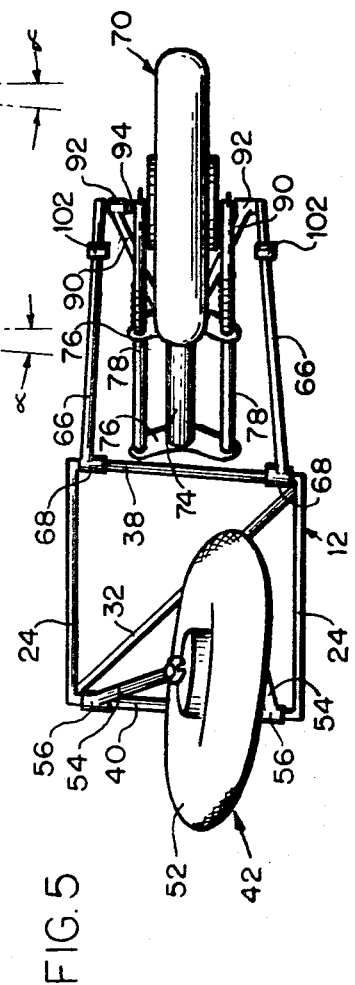
FIG. 5 is a top plan view generally corresponding to the condition of the motorcycle or motor scooter as shown in FIG. 4.
Figure 11:
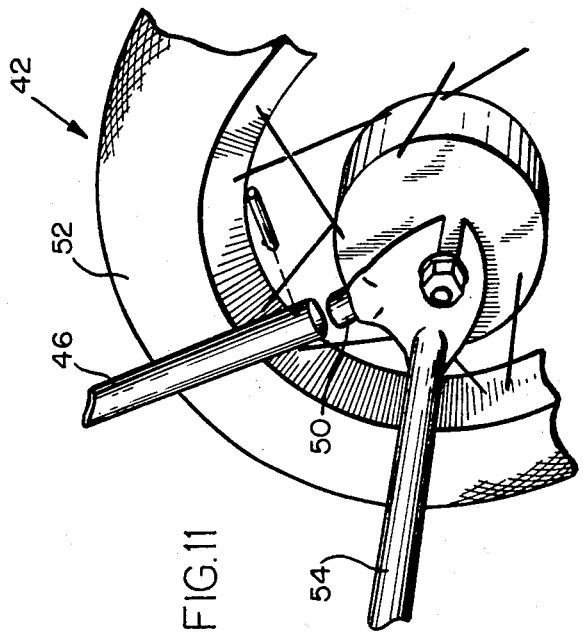
FIG. 11 is a fragmentary, perspective view, partially exploded, illustrating the rear wheel assembly of the present invention.

The rear wheel assembly 42 includes the transverse tube 36 that is readily removable from the upper, rearward end of the chassis 12. To facilitate assembly and disassembly of the rearward, transverse tube 36, a pair of sleeves 44 (FIG. 12) are welded transversely at the juncture of each of the upper and rearward tubes 22 and 28 of each chassis side frame section. The rearward, transverse tube 36 slides freely within the sleeves 44. A pair of rear tubular arms 46, each having a sleeve 48 (FIG. 12), welded transversely to one end thereof, are removably supported on the transverse tube 36. The lower end of each of the rear arms 46 is telescopingly received and removably secured by any suitable means, such as a pin, in a socket 50 (FIG. 11) that is mounted on the hub of the rear wheel 52. A pair of trailing arms 54 are also mounted on the hub of the rear wheel assembly 42 with the opposite ends of the trailing arms 54 having sleeves 56 welded transversely thereto. The skewed rearward tube 40 at the bottom of the chassis assembly pivotally supports the sleeve 56 of each of the trailing arms 54. Thus, with the rearward transverse tube 36 removed as shown in FIG. 3, the rear wheel assembly 42, which includes the trailing arms 54, may be pivoted upwardly into a compartment 58 (FIG. 4) defined by the side frame sections of the chassis and the remaining transverse and diagonal tubes. As may best be seen in FIGS. 5, 6 and 7, the rear wheel assembly 42 is skewed when positioned within the compartment 58.

Figure 12:
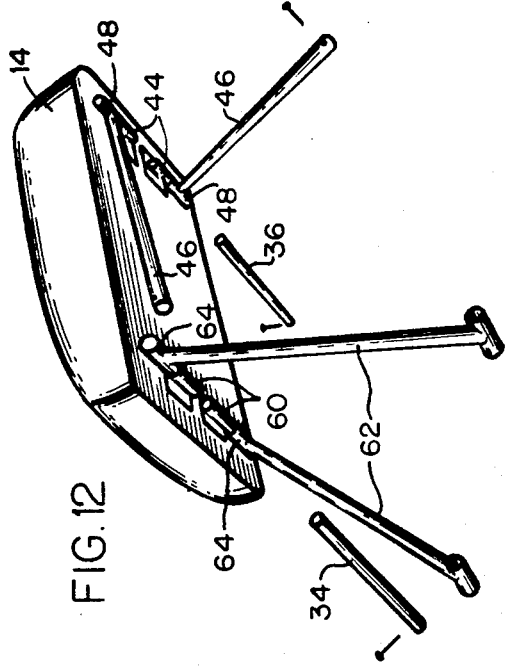
FIG. 12 is a fragmentary, perspective view, partially exploded, illustrating the seat assembly of the present invention.

At the juncture at each of the top, forward and diagonal tubes, 22, 26 and 30, respectively, of each of the chassis side frame sections, there is welded a transverse sleeve 60 (FIG. 12). Each of two longitudinally extending tubes 62 is provided with a transversely welded sleeve 64 (FIG. 12) at one end thereof. The upper, transverse tube 34, at the forward end of the chassis 12, is removably received and retained in the sleeves 60 and 64, by any suitable means such as pins, for supporting the upper, longitudinal tubes 62.

Similarly, there is provided a pair of lower, longitudinally extending tubes 66, each of which is provided with a sleeve 68, welded transversely to the rearward end thereof. The ends of the skewed tube 38 at the forward end of the bottom of the chassis 12 are received in the sleeves 68 so that the forward or front wheel assembly 70 may be folded into the compartment 58 in a manner to be described hereinafter.

Figure 8:
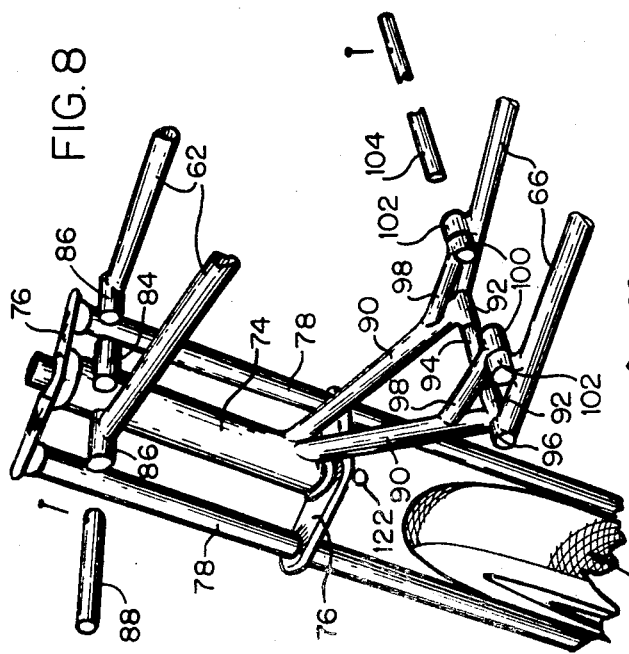
FIG. 8 is a fragmentary, perspective view, partially exploded, illustrating the steering column assembly of the present invention.

Referring now particularly to FIGS. 8 and 10, it will be seen that the front wheel assembly 70 includes steering means 72 that comprises a central, tubular column 74, a pair of V-shaped brackets 76 at the upper and lower ends of the column 72, respectively, and a pair of laterally spaced posts 78 that are substantially parallel to the column 74. Shock absorbers 80 are mounted on the posts 72 for resiliently supporting the front wheel 82.

Figure 9:
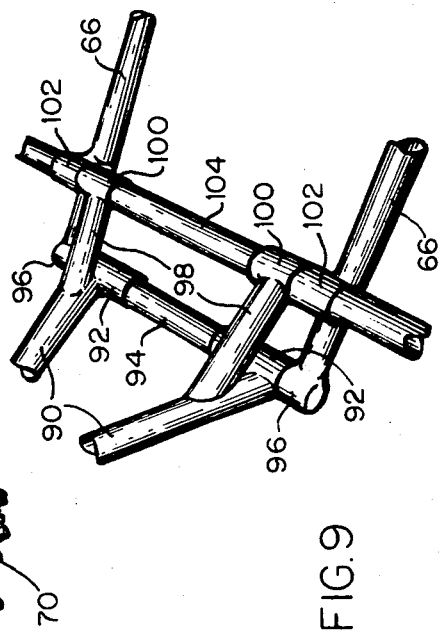
FIG. 9 is a fragmentary, perspective view of the foot support portion of the present invention.

The tubular column 74 is provided with a transverse sleeve 84 (FIG. 8) welded proximate the upper end thereof. The forward end of each of the upper, longitudinal tubes 62 is also provided with a transverse sleeve 86 welded thereto. A tubular member 88 is adapted to be removably received and retained in the sleeves 84 and 86 by any suitable means, such as pins for example. A pair of arms 90 are divergently welded proximate the lower end of the tubular column 74 with each of the arms 90 terminating at its opposite end in a transverse, integral sleeve 92 (FIGS. 8 and 9). A rod 94 extends through the sleeves 92 and pivotally supports, at its opposite ends, a sleeve 96 that is welded transversely to the forward end of the lower longitudinally extending tubes 66. Generally longitudinal extensions 98 are welded at one end proximate the lower end of each of the arms 90 and are provided with transverse sleeves 100 at the opposite or free ends thereof. Transverse sleeves 102 are also welded near the ends of the lower, longitudinally extending tubes 66 and slightly rearward of the sleeves 96. A transverse tube 104, that defines a foot rest, is removably received and retained in the sleeves 100 and 102 by any suitable means such as a pin.

Figure 1:
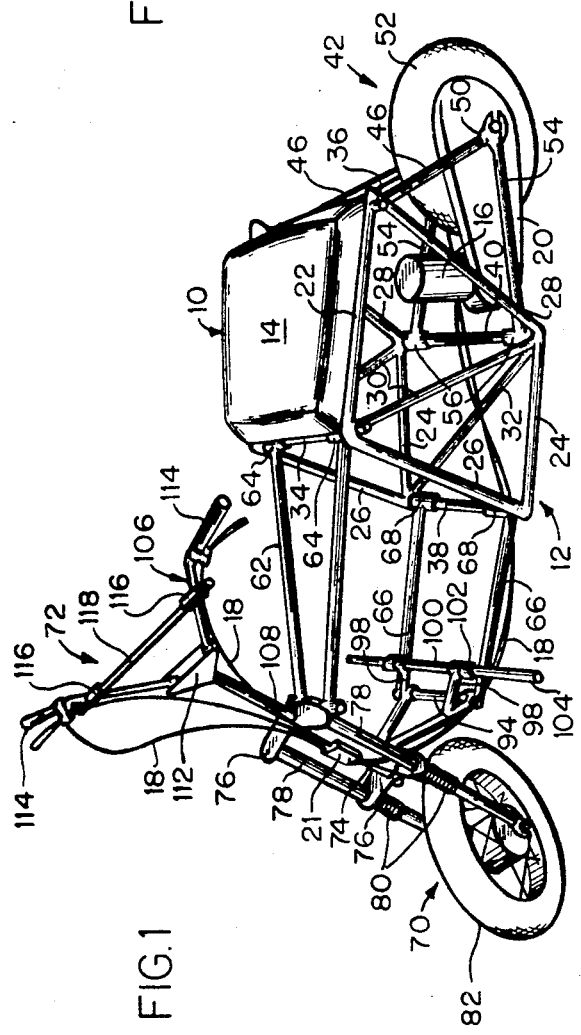
FIG. 1 is a perspective view of the motorcycle or motor scooter comprising the present invention, the view being taken generally from the top and the side.
Figure 2:
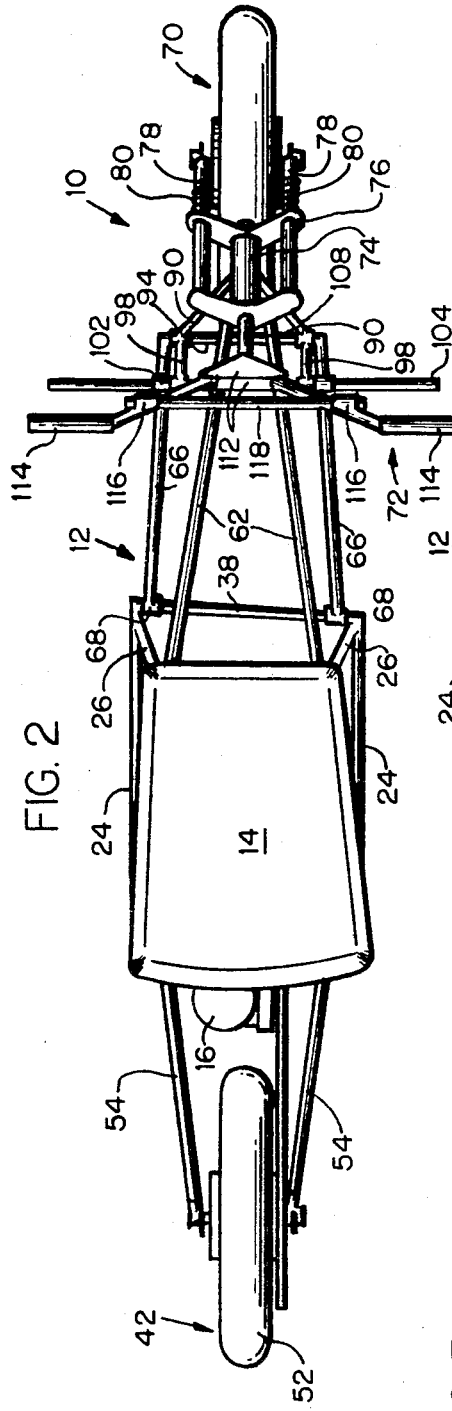
FIG. 2 is a top plan view of the structure shown in FIG. 1.

The handlebar assembly 106 is comprised of a post 108 that is adapted to be received in the tubular column 74. Stop means 110 are provided on the post 108 for limiting the inward movement of the handlebar assembly 106 and fork means 109, the ends of which are adapted to be received in the upper bracket 76 are provided for keying the handlebar assembly 106 with respect to the tubular column 74. A pair of brackets 112 are secured to the upper end of the post 108 and includes pivot means for foldably supporting two laterally extending handlebars 114. A transverse sleeve 116 (FIGS. 1 and 2) is welded to each handlebar 114 in order to receive a transverse tube 118 that locks the handlebars 114 in the proper position. A pin 120, extending through a transverse sleeve 122 formed integrally at the lower end of the post 108 provides convenient means for releasably retaining the handlebar assembly 106.

Figure 7:
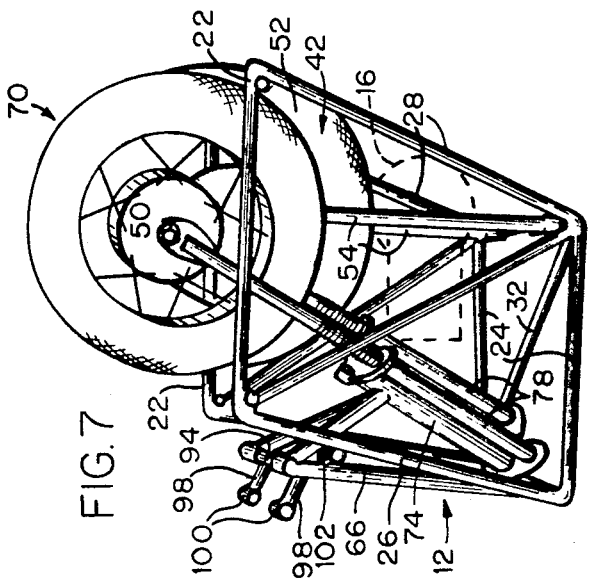
FIG. 7 is a perspective, side elevational view showing the present invention fully folded but with several of the loose components omitted for clarity.

To fold the motorcycle, the upper transverse tubes 34 and 36 at the forward and rearward ends of the chassis 12 are removed and the rear wheel assembly 42 is pivoted about the skewed rearward tube 40 at the bottom of the chassis 12 so that the rear wheel assembly 42 assumes a skewed position within the compartment 58. It should, of course, be understood that when the upper transverse tube 36 is removed, the rear arms 46 are also removed. With the upper transverse tube 34 at the forward end of the chassis 12 removed, the front wheel assembly 70 may then be folded into the compartment 58. The foot rest tube 104 is first removed and then the front wheel assembly 70 is initially pivoted about the tubular member 94 in order to assume the position shown in FIG. 4. Then the front wheel assembly 70, together with the lower longitudinally extending tubes 66, is pivoted about the skewed forward tube 38 at the bottom of the chassis 12 so that the front wheel assembly 70 assumes a skewed position within the compartment 58 as shown in FIG. 7. The side-by-side relationship of the front and rear wheel assemblies 70 and 42, respectively, may best be seen in FIGS. 6 and 7.

From the foregoing, it will be appreciated that a light-weight, low cost and extremely compact construction has been provided for a folding motor scooter.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A folding motorcycle comprising:
   a. chassis means including a pair of laterally spaced side sections and a plurality of generally transverse rods joining said side sections of said chassis means at the top and bottom thereof for defining a compartment between said side sections of said chassis means, said bottom rods at the forward and rearward ends of said chassis means being skewed at an angle with respect to an axis that is transverse to the longitudinal axis of the said motorcycle, said forward and rearward rods at the top of said chassis means being readily removable;
   b. a rear wheel assembly pivotally mounted on said rearward, bottom rod so as to be contained in a skewed position within said compartment when said motorcycle is folded;
   c. a front wheel assembly pivotally mounted on said forward, bottom rod so as to be contained in a skewed position within said compartment when said motorcycle is folded;
   d. readily detachable steering means coupled to said chassis and to said front wheel assembly; and
   e. an internal combustion engine mounted on said chassis and drivingly coupled to said rear wheel assembly.

2. A motorcycle in accordance with claim 1, wherein said angles of said bottom tubes are equal to each other.

3. The motorcycle in accordance with claim 1, wherein said angles of said bottom tubes are approximately 5°.

4. The motorcycle in accordance with claim 1, wherein there is further included a seat secured to said chassis.

5. The motorcycle in accordance with claim 4, wherein said seat is at least partially hollow and defines a fuel tank that is in fluid communication with said internal combustion engine.

6. The motorcycle in accordance with claim 1, wherein said steering means is coupled to said chassis by means of a pair of removable, laterally spaced upper rods extending longitudinally and a pair of removable laterally spaced lower rods extending longitudinally, said steering means being coupled to the forward end of said lower rods for pivotal movement about an axis transverse thereto, the rearward end of said longitudinally extending lower rods being coupled to the lower forward end of said chassis for pivotal movement about said skewed axis of said bottom rod thereof.

7. The motorcycle in accordance with claim 6, wherein there is further included a removable transverse rod for defining a foot rest, said foot rest being mounted on said lower rods proximate the forward end thereof.

8. The motorcycle in accordance with claim 1, wherein said steering means are foldable.

9. The motorcycle in accordance with claim 1 wherein said laterally spaced side sections of said chassis means are comprised of a plurality of rods that are integrally joined to each other.

* * * * *